United States Patent
Williams et al.

(10) Patent No.: US 8,905,452 B2
(45) Date of Patent: Dec. 9, 2014

(54) GRIPPER WITH FORCE-MULTIPLYING MECHANISM

(71) Applicant: PHD, Inc., Fort Wayne, IN (US)

(72) Inventors: Matthew R. Williams, Fort Wayne, IN (US); Lyle A. Null, Markle, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 13/650,238

(22) Filed: Oct. 12, 2012

(65) Prior Publication Data
US 2013/0181469 A1    Jul. 18, 2013

Related U.S. Application Data

(60) Provisional application No. 61/546,656, filed on Oct. 13, 2011.

(51) Int. Cl.
*B25J 15/02*    (2006.01)

(52) U.S. Cl.
USPC .......................................... 294/207; 294/192

(58) Field of Classification Search
USPC ............. 294/119.1, 192, 207; 269/25, 26, 32, 269/33; 901/37
See application file for complete search history.

(56) References Cited

U.S. PATENT DOCUMENTS

| | | | | |
|---|---|---|---|---|
| 4,475,607 A * | 10/1984 | Haney | ............................. | 188/67 |
| 4,544,193 A * | 10/1985 | Dunn et al. | ................... | 294/86.4 |
| 4,728,137 A * | 3/1988 | Hamed et al. | ................. | 294/202 |
| 6,193,292 B1 * | 2/2001 | Maffeis et al. | ................ | 294/207 |
| 6,273,485 B1 * | 8/2001 | Maffeis et al. | ................ | 294/207 |
| 6,394,521 B1 * | 5/2002 | Bertini | ......................... | 294/207 |
| 6,428,071 B2 * | 8/2002 | Bertini | ....................... | 294/119.1 |
| 7,490,881 B2 * | 2/2009 | Null et al. | ..................... | 294/207 |
| 7,635,154 B2 * | 12/2009 | Maffeis | ........................ | 294/207 |
| 7,976,087 B2 * | 7/2011 | Maffeis | ........................ | 294/207 |
| 8,267,451 B2 * | 9/2012 | Pedrazzini | ..................... | 294/207 |
| 2004/0159996 A1 * | 8/2004 | Migliori | .......................... | 269/32 |

* cited by examiner

*Primary Examiner* — Dean Kramer
(74) *Attorney, Agent, or Firm* — Taylor IP, P.C.

(57) ABSTRACT

A gripper for gripping a workpiece includes a jaw assembly having an actuator with a housing and an elongate member axially slidably movable within the housing. A force-multiplying mechanism is interconnected between the elongate member and the housing. The force-multiplying mechanism is configured to add a mechanical force to the jaw assembly and thereby increase a gripping force on the workpiece during operation of the gripper.

22 Claims, 19 Drawing Sheets

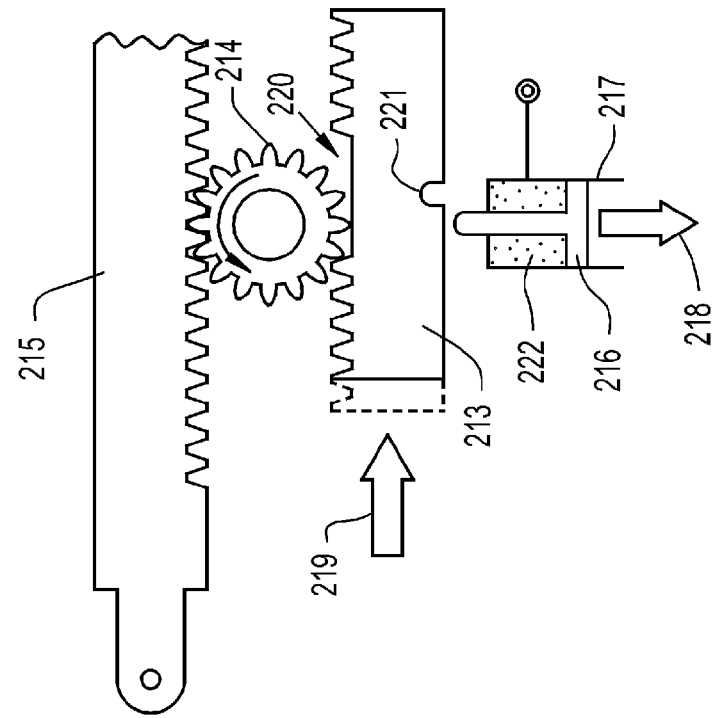
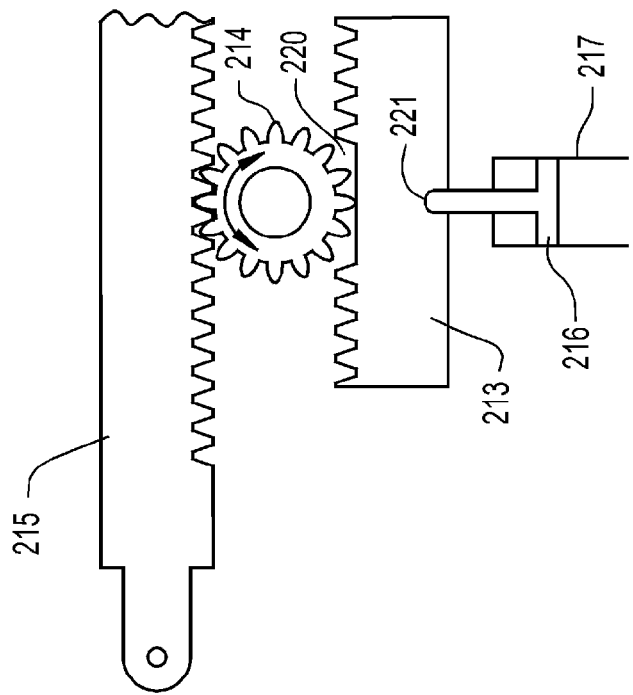
Fig. 9b
Fig. 9a

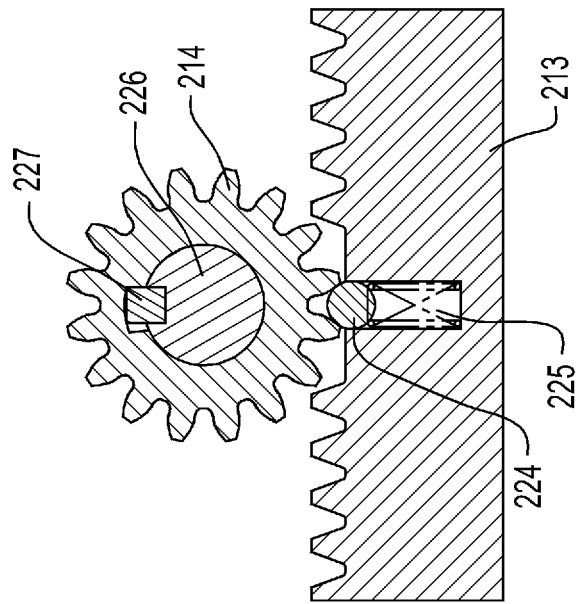
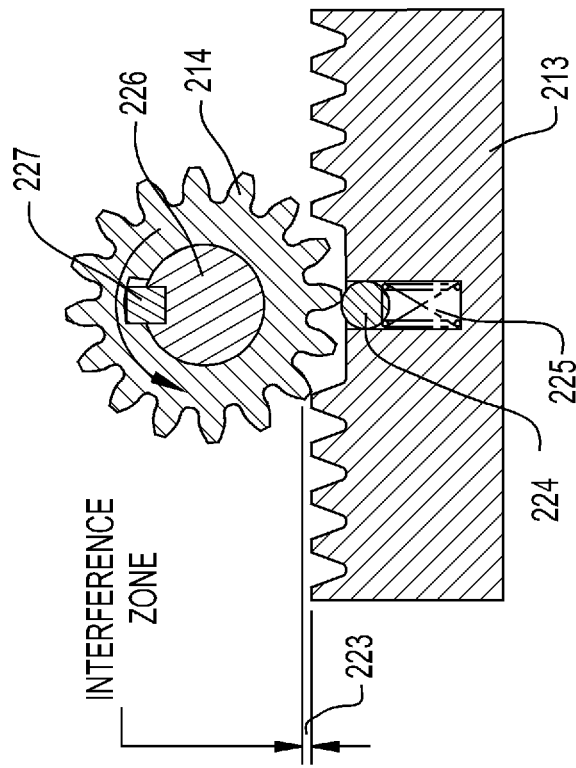
Fig. 11a
Fig. 11b

GRIPPER WITH FORCE-MULTIPLYING MECHANISM

CROSS REFERENCE TO RELATED APPLICATIONS

This is a non-provisional application based upon U.S. provisional patent application Ser. No. 61/546,656, entitled "GRIPPER WITH FORCE-MULTIPLYING MECHANISM", filed Oct. 13, 2011, which is incorporated herein by reference.

BACKGROUND OF THE INVENTION

1. Field of the Invention

The present invention relates to grippers for gripping a workpiece.

2. Description of the Related Art

Grippers are mechanical devices characterized by one or more jaws that move together or apart by motive force typically from an electric motor or pneumatic piston. Once moved into a position of contact with the gripped workpiece, the jaws produce a gripping force against the workpiece. It is often desirable for the gripper to provide as large a gripping force as possible while also possessing a minimum weight and physical size. Typically, increasing gripping force increases the size of the motor or piston which increases the weight and physical size of the gripper.

By it's nature, operation of a gripper involves two distinct actions. The jaws must first be moved into a position of contact with the workpiece, after which, the jaws apply a force against the workpiece sufficient to affect subsequent movement (e.g., lifting) of the workpiece. Moving the jaws to the workpiece requires each jaw to exert enough force to overcome the mass inertia of any tooling attached to the jaw and any friction between the jaw and the surfaces of the gripper body that support and guide the jaw. The second action requires each jaw to exert the full intended grip force against the workpiece. While gripping, the jaws must only move sufficiently to compensate for any compliancy from the workpiece or tooling to maintain gripping contact. In other words, the actions of the gripper are separable into two regimes; the first being the jaws traveling some distance with low force until contact is made; and the second is the jaws applying high force against the object.

SUMMARY OF THE INVENTION

The present disclosure describes a gripper that incorporates a force-multiplying mechanism to exploit the operational differences between these two regimes. Illustratively an embodiment of the gripper employs an increased gripping force over reduced jaw travel to hold the workpiece, in contrast to gripping the workpiece.

The invention in one form thereof is directed to a fluid actuated gripper for gripping a workpiece. The gripper includes a jaw assembly having a cylinder, a piston slidably positioned within the cylinder, and a piston rod having a first end coupled with the piston. The piston has a head end positioned adjacent a fluid chamber for receiving a pressurized fluid. A force-multiplying mechanism is interconnected between a second end of the piston rod and the cylinder. The force-multiplying mechanism is configured to add a mechanical force to the jaw assembly and thereby increase a gripping force on the workpiece during operation of the gripper.

The invention in another form thereof is directed to a method of operating a fluid actuated gripper for gripping a workpiece, including the steps of: providing a jaw assembly including a cylinder, a piston slidably positioned within the cylinder, and a piston rod having a first end coupled with the piston, the piston having a head end positioned adjacent a fluid chamber; positioning the jaw assembly relative to the workpiece; pressurizing the fluid chamber with a fluid and thereby causing extension of the piston and the piston rod from the cylinder, and generating a gripping force on the workpiece using the jaw assembly; generating a mechanical force using a force-multiplying mechanism interconnected between a second end of the piston rod and the cylinder, using the extension of the piston rod from the cylinder; and applying the mechanical force to the jaw assembly and thereby cumulatively increasing a gripping force on the workpiece during operation of the gripper.

The invention in yet another form thereof is directed to a gripper for gripping a workpiece, including a jaw assembly having an actuator with a housing and an elongate member axially slidably movable within the housing. A force-multiplying mechanism is interconnected between the elongate member and the housing. The force-multiplying mechanism is configured to add a mechanical force to the jaw assembly and thereby increase a gripping force on the workpiece during operation of the gripper.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 9a and 9b illustrate another embodiment of the force-multiplying mechanism of the present invention;

FIGS. 11a and 11b illustrate a keyway and detent arrangement that can be used to obviate the interference shown in FIG. 10;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
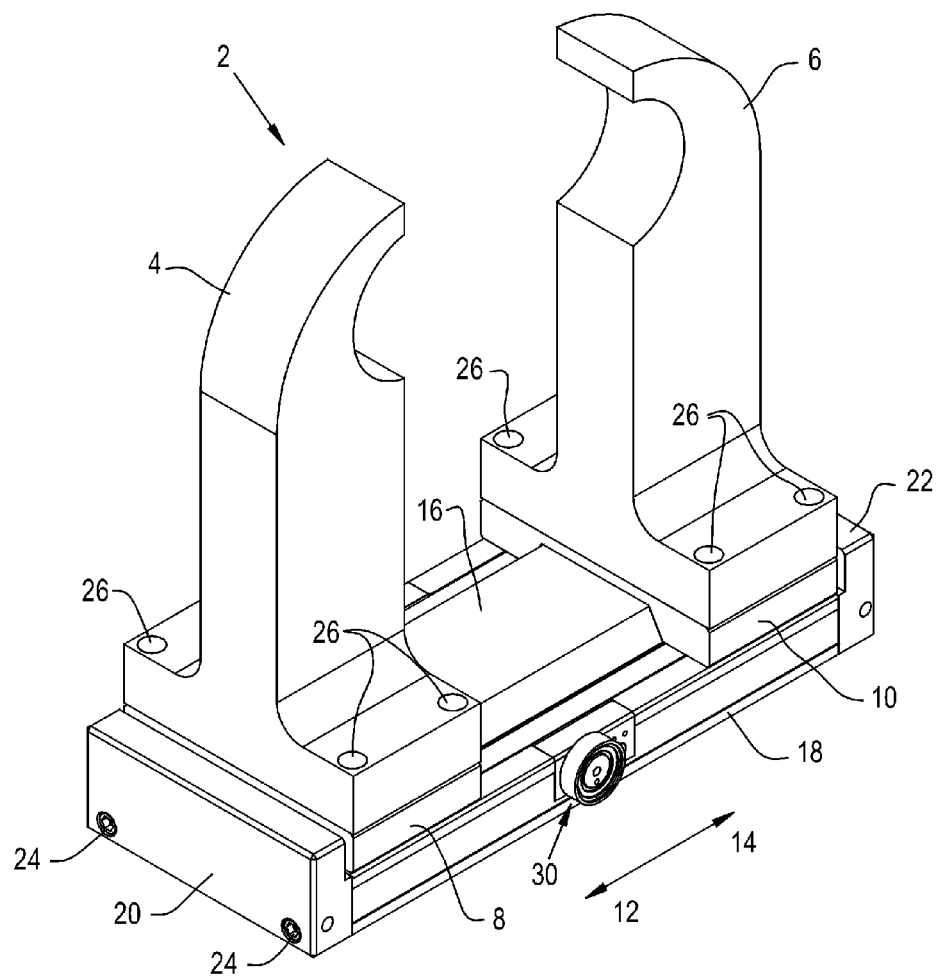
FIG. 1 is a perspective view of an embodiment of a gripper of the present invention.

Referring now to the drawings, and more particularly to FIG. 1, there is shown a gripper 2 that includes a perspective view of a force-multiplying system of the present invention. Gripper 2 includes jaw arms 4 and 6 each attached to a jaw bridge 8 and 10, respectively. Bridges 8 and 10 are slideable in directions 12 and 14 along cover 16. Jaw bridges 8 and 10 are also supported by plate 18 capped by end plates 20 and 22. Fasteners 24 attach end plates 20 and 22 to each respective end of plate 18. Similarly, fasteners 26 illustratively attach jaw arms 4 and 6 to their respective bridges 8 and 10. It is appreciated that jaw arms 4 and 6 may be of any variety of configurations to hold a desired workpiece. The illustrative design of arms 4 and 6 in this embodiment demonstrates their ability to hold a tubular workpiece such as workpiece 28 shown in FIG. 2. A brake assembly 30 is configured to decelerate a moving jaw to rest and hold a stopped jaw in a stationary position. This may become useful during operation of gripper 2 if emergency stopping or retention of the gripped workpiece occurs.

Figure 2:
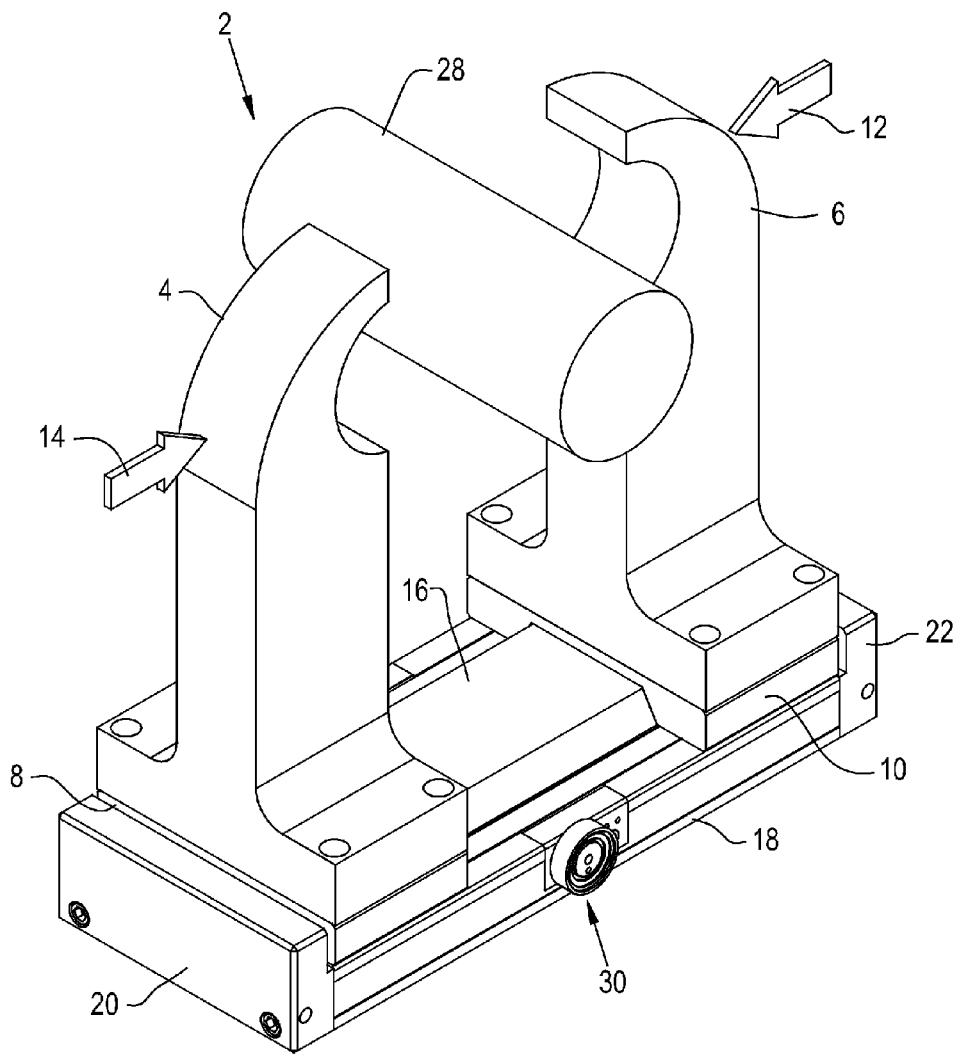
FIG. 2 is another perspective view of the gripper shown in FIG. 1, positioned relative to an exemplary workpiece.

Another perspective view of gripper 2 is shown in FIG. 2. This view depicts how jaw arms 4 and 6 move in directions 14 and 12, respectively, in anticipation of gripping onto workpiece 28. As previously discussed, this movement is the first stage where only the inertia of the components of the gripper itself such as arms 4 and 6, bridges 8 and 10, and piston assemblies 53A and 53B, jaw assemblies 56A and 56B, and driven racks 15A and 15B shown in FIGS. 13 and 14, must be overcome in addition to friction in order to at least move jaw arms 4 and 6 against workpiece 28.

Figure 3:
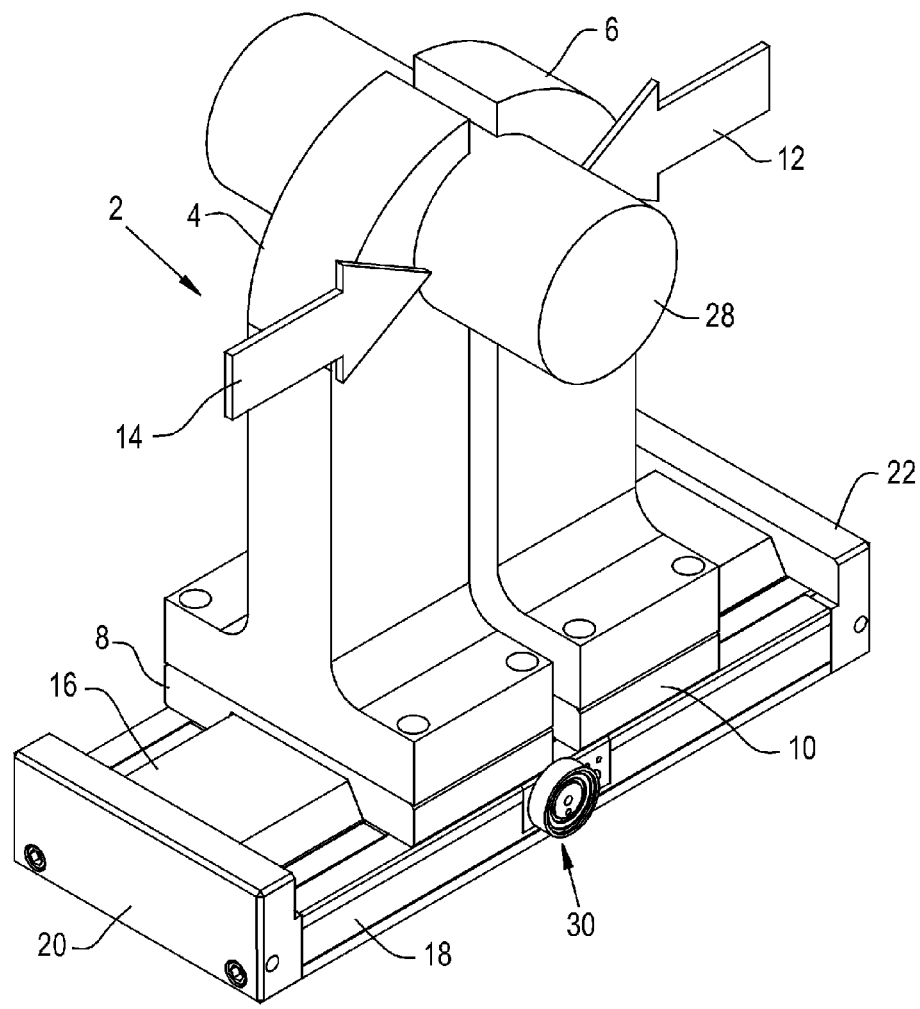
FIG. 3 is another perspective view of the gripper shown in FIGS. 1 and 2, gripping the workpiece.

A perspective view of gripper 22 shown in FIG. 3 depicts the second stage which is multiplying the force in directions 14 and 12 by jaws 4 and 6 to create a firmer grip on workpiece 28. As previously discussed, although conventional grippers are designed to grip and hold a workpiece, this gripper is configured to apply a multiplying force to that holding function to create a more substantial hold force on the workpiece.

Figure 4:
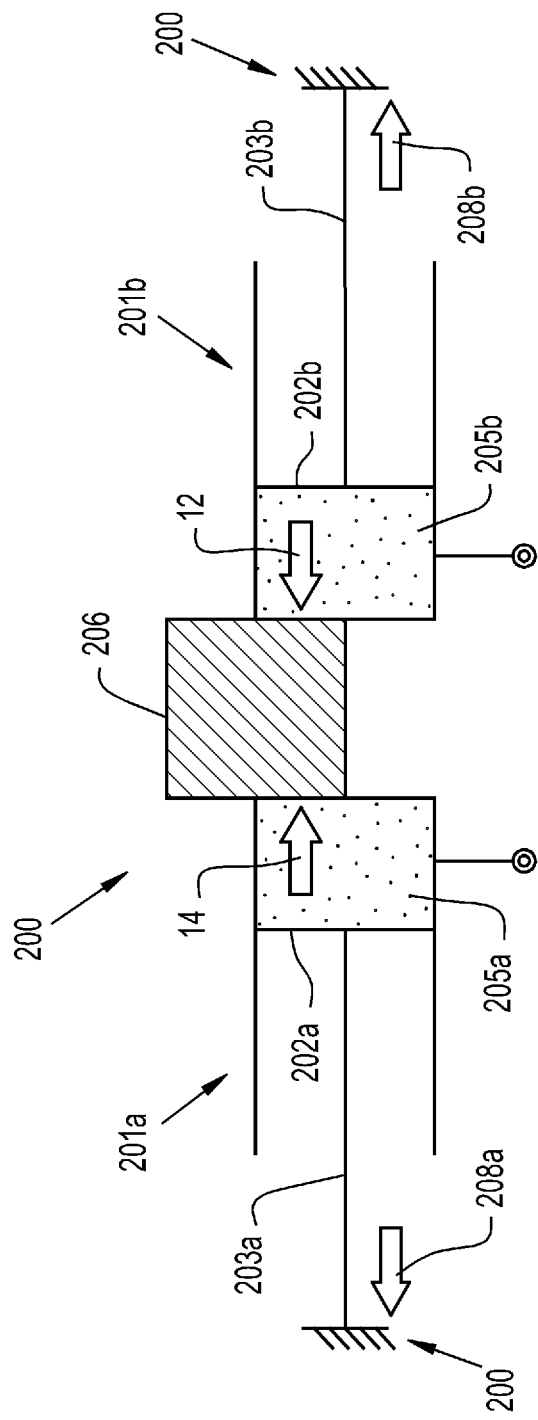
FIG. 4 is a schematic view of a prior art gripper.
Figure 5:
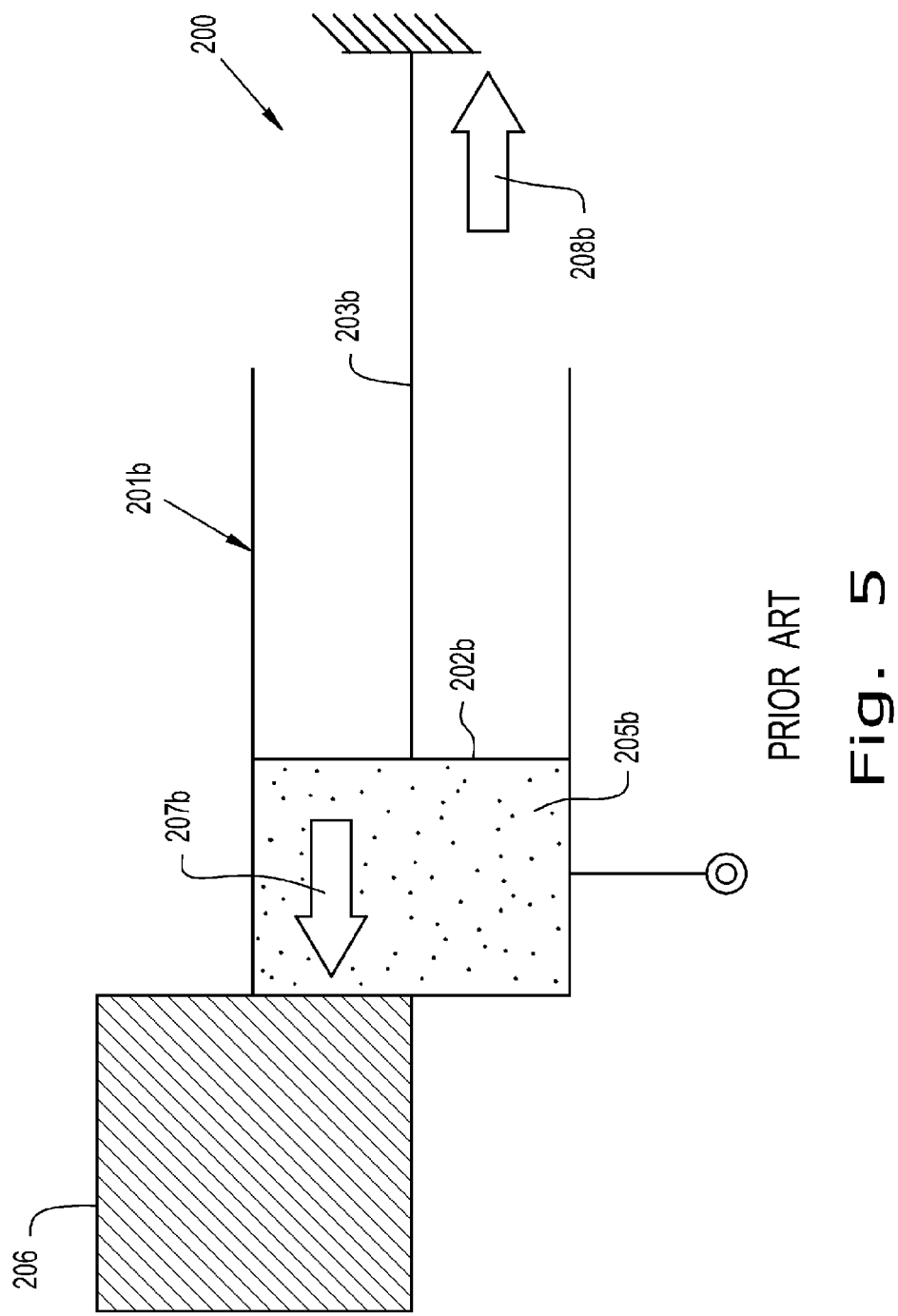
FIG. 5 is another schematic view of the prior art gripper shown in FIG. 4.
Figure 6:
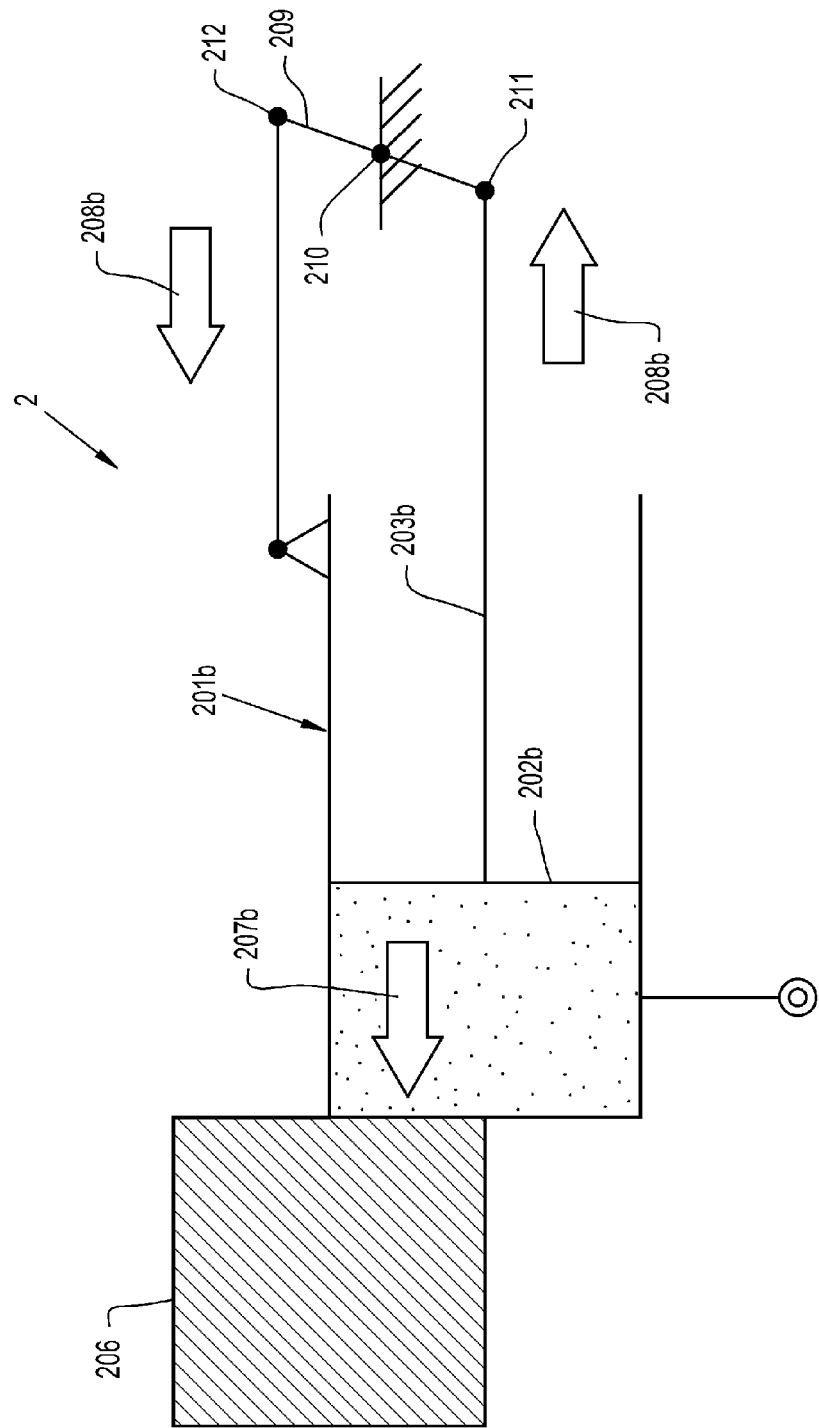
FIGS. 6 and 7 are schematic views of the gripper of the present invention shown in FIGS. 1-3, including an embodiment of the force-multiplying mechanism of the present invention.
Figure 7:
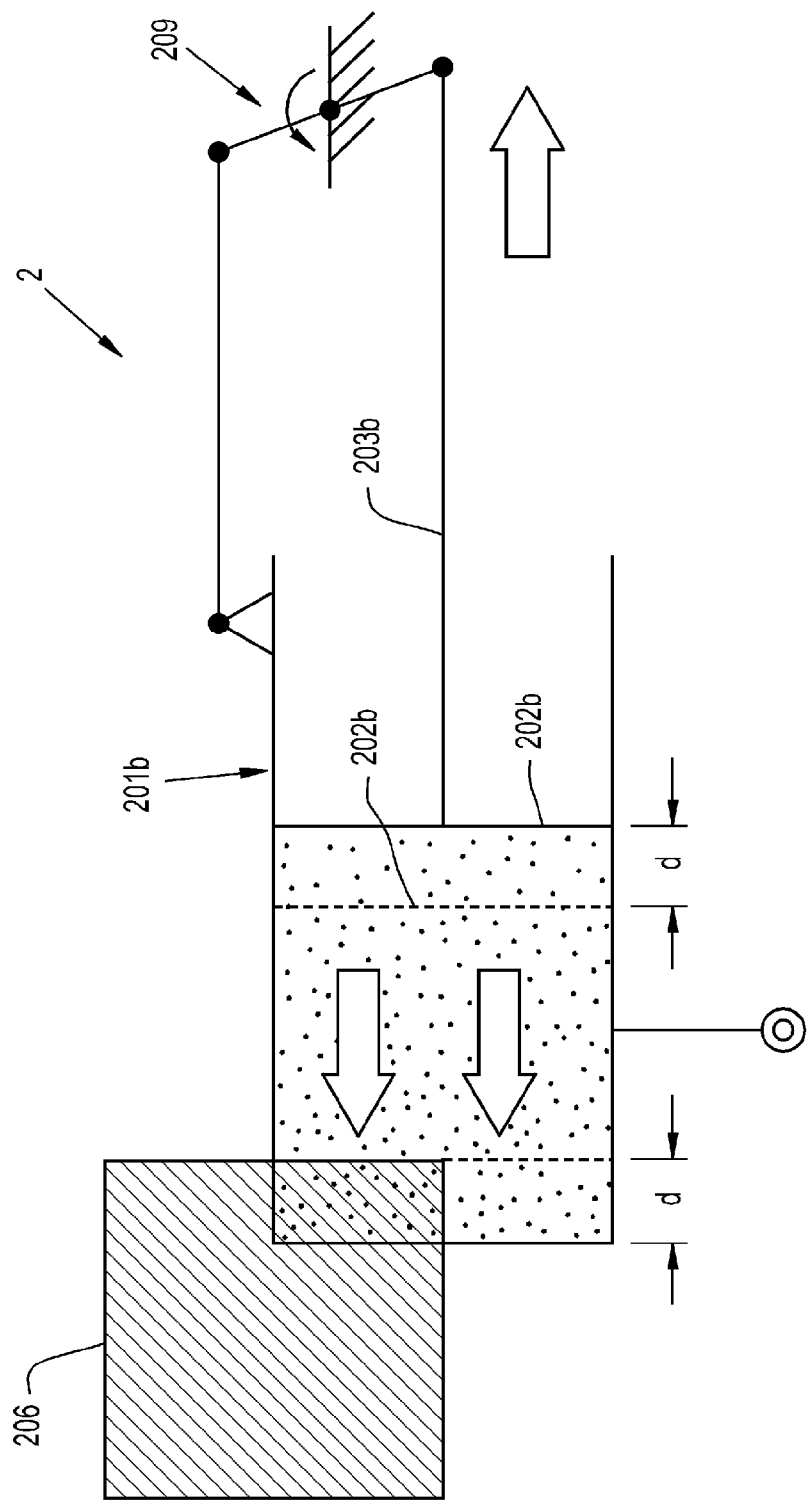
Figure 8:
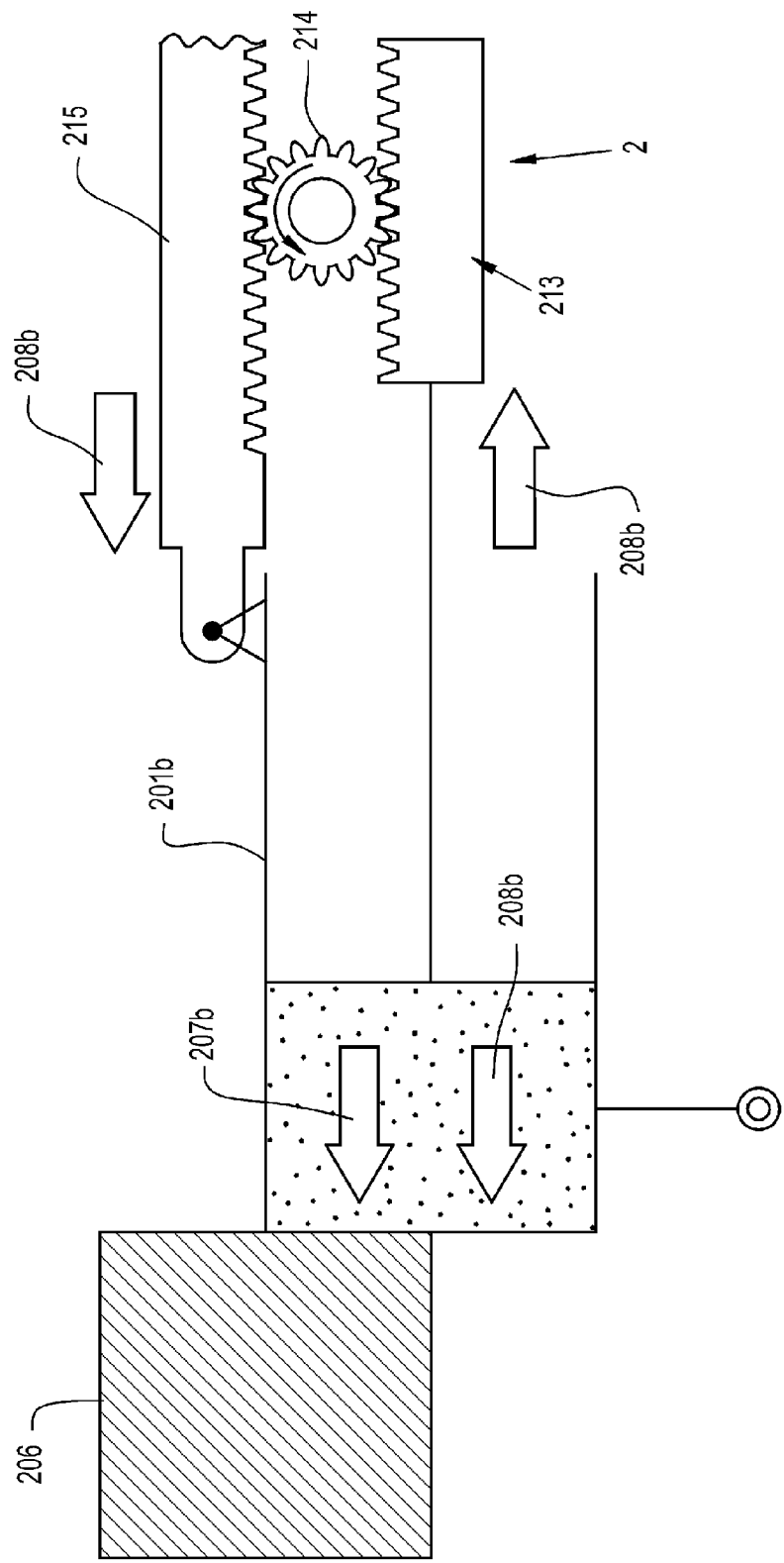
FIG. 8 is a partially schematic view of the gripper of the present invention shown in FIGS. 1-3, including another embodiment of the force-multiplying mechanism of the present invention.

Operational schematic views of a prior art gripper 200 is shown in FIGS. 4 and 5 and current gripper 2 is shown in FIGS. 6-8. The view of FIG. 4 represents the prior art two jaw pneumatic gripper 200 wherein each jaw consists of a movable cylinder 201*a* and 201*b* fitted around pistons 202*a* and 202*b* held stationary by rods 203*a* and 203*b* and connected to the body of the gripper 200 (denoted by the "ground" symbol). When compressed air fills volumes 205*a* and 205*b* between the closed end of the cylinder and the piston, the cylinders move in directions 14 and 12, respectively until the jaws contact workpiece 206. Cylinders 201*a* and 201*b* continue apply a force against the object. The force applied to the workpiece is balanced by an equal and opposite force 208*a* and *b* applied to the body of gripper 200 via their respective piston rods 203*a* and 203*b*.

A view of the prior art in FIG. 5 depicts one side of gripper 200 with cylinder force 207*b* acting against gripped object 206 and an equal, but opposite piston force 208*b* transmitted through piston rod 203*b* to ground.

In contrast to gripper 200, the schematic view of gripper 2 in FIG. 6 shows lever 209 free to rotate about a mid-point 210 to move piston rod 203*b* via pivot 211. The opposite end of the lever 209 is attached to cylinder 201*b* via pivot 212. The piston force 208*b* no longer travels to gripper portion 2, but is redirected by lever 209 to cylinder 201*b*. In the illustrated embodiment, the pivot point of lever 209 is positioned at the mid-point 210 between pivots 211 and 212 at the opposite ends of lever 209. However, it will be appreciated that the relative position of the pivot point between pivots 211 and 212 can be selected to provide a desired degree of force magnification using the force-multiplying mechanism of the present invention.

FIG. 7 shows, in schematic form, the relative movements of piston 202*b* and cylinder 201*b* under the influence of lever 209. For any distance "d" along which cylinder 201*b* moves, piston 202*b* moves an equal, but opposite distance "d".

The schematic view in FIG. 8 illustrates how the lever 209 can be effectively replaced by rack and pinion arrangement including a driving rack 213, pinion gear 214, and driven rack 215 system with the force 208*b* applied by the piston to the rack adding to the force 207*b* applied by cylinder 201*b* to the gripped workpiece 206. The lengths of the two rack segments 213 and 215 may be chosen to provide for any practical length of force-multiplied jaw travel.

It should be appreciated that the lever 209 with pivots 211 and 212 and the rack and pinion arrangement including driving rack 213, pinion gear 214 and driven rack 215 constitute force reversing mechanisms that re-direct force, which would normally be transmitted to the ground opposite the gripped workpiece, toward the gripped workpiece. These mechanisms therefore multiply the force that is applied to the gripped workpiece by adding the re-directed force, shown as arrow 208*b* pointing to the left of the page in FIG. 6, to cylinder force 207*b* in the direction of the gripped workpiece.

FIG. 9*a* illustrates how driving rack 213 is held stationary by a "shot-pin" cylinder 217 which includes a piston assembly 216 free to move vertically, but constrained from horizontal motion by cylinder 217. A portion of the piston assembly 216 engages a mating notch 221 in driving rack 213. (See also FIG. 9*b*). A stripped area 220 of driving rack 213 has no teeth. This allows driven rack 215 to rotate pinion gear 214 unencumbered as driven rack 215 translates under the influence of cylinder 201*b* as it moves to contact workpiece 206. (See FIG. 8).

As depicted in FIG. 9*b*, after cylinder 201*b* contacts workpiece 206, compressed air is allowed to fill volume 222 between the closed end of shot-pin cylinder 217 and piston assembly 216. This forces piston assembly 216 to travel in direction 218. Piston assembly 216 is, thus, retracted from notch 221 allowing rack 213 to move in direction 219 until one tooth of rack 213 contacts a mating tooth on pinion gear 214. Once in contact, driving rack 213 is free to transfer force applied to the rack in direction 219, through pinion gear 214 to driven rack 215.

Figure 10:
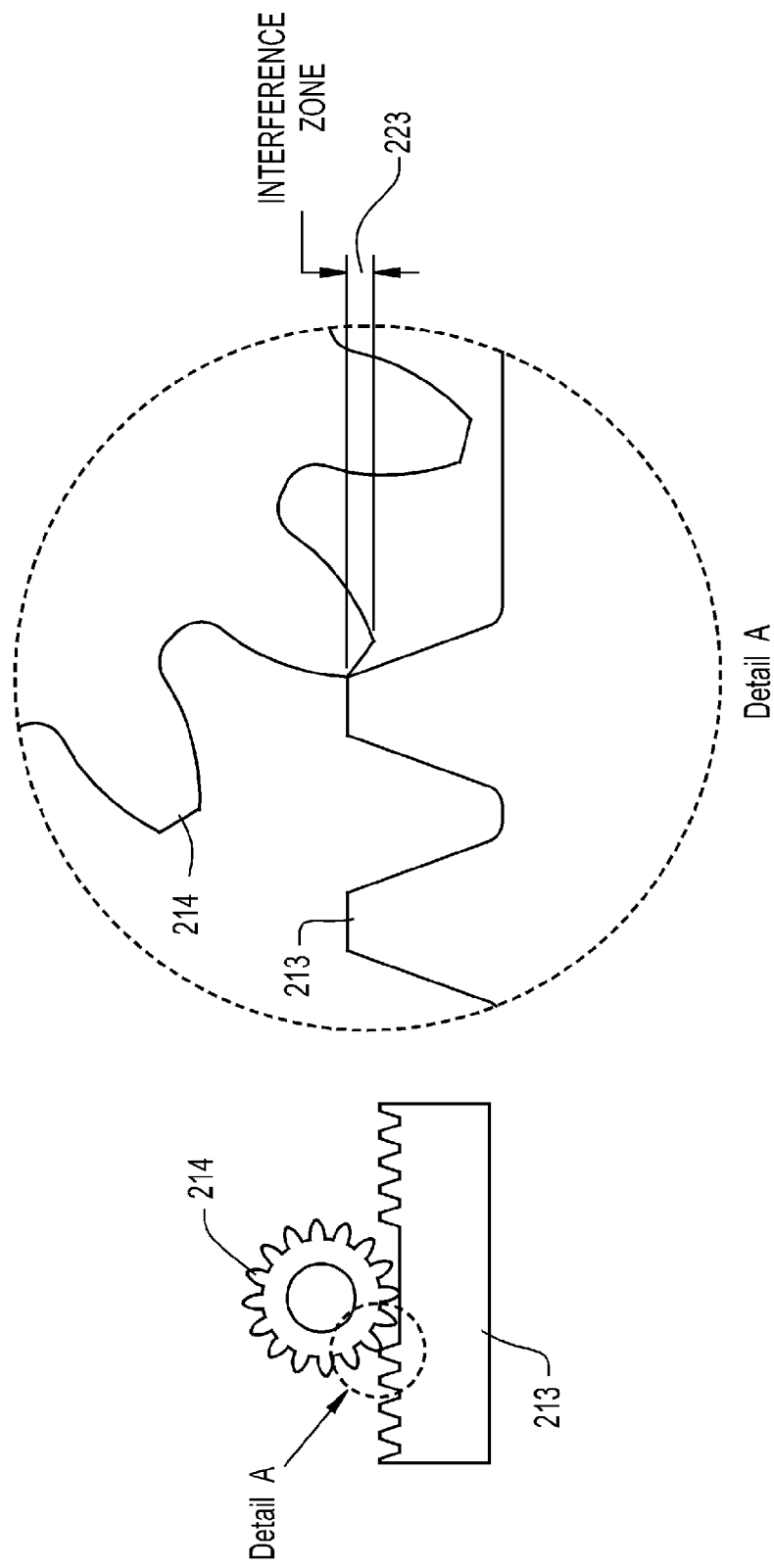
FIG. 10 illustrates a potential interference condition that can occur between the rack and pinion of the force-multiplying mechanism.

FIG. 10 shows a potentially problematic condition that may occur while driving rack 213 moves to engage a tooth on pinion gear 214. The orientation of pinion gear 214 relative to driving rack 213 is controlled by the stopping position of driven rack 215 as cylinder 201*b* contacts workpiece 206. (See, also, FIG. 5.) It is possible that pinion gear 214 may be stopped by driven rack 215 such that the position of the engaging tooth of the pinion gear 214 will contact the mating tooth of driving rack 213 somewhere within interference zone 223. Within zone 223, the flank of the driving rack tooth does not mesh with the involute flank of the pinion gear, but contacts the top of the gear tooth instead. In this condition, torque cannot be transmitted from driving rack 213 to pinion gear 214 causing the gear to jam.

FIGS. 11a and 11b illustrate how this jamming condition can be obviated by including a ball-detent with ball 224 and spring 225 located within an appropriate sized bore in driving rack 213. The ball-detent may be used in conjunction with a second pinion gear (not shown) attached to shaft 226 to drive driven rack 215 (see FIG. 8). A machine key 227 couples pinion gear 214 to shaft 226 via a mating sector shaped key-slot in the pinion gear so that rotation of the machine key simultaneously rotates shaft 226 and the attached second pinion gear. If pinion gear 214 should stop anywhere within interference zone 223, as shown in FIG. 11a, the sector shaped key-slot in the pinion gear allows pinion gear 214 to rotate, illustratively counter-clock-wise, relative to shaft 226 by contact with ball 224 acting under the influence of spring 225 to a position beyond interference zone 223, as shown in FIG. 11b.

Figure 12:
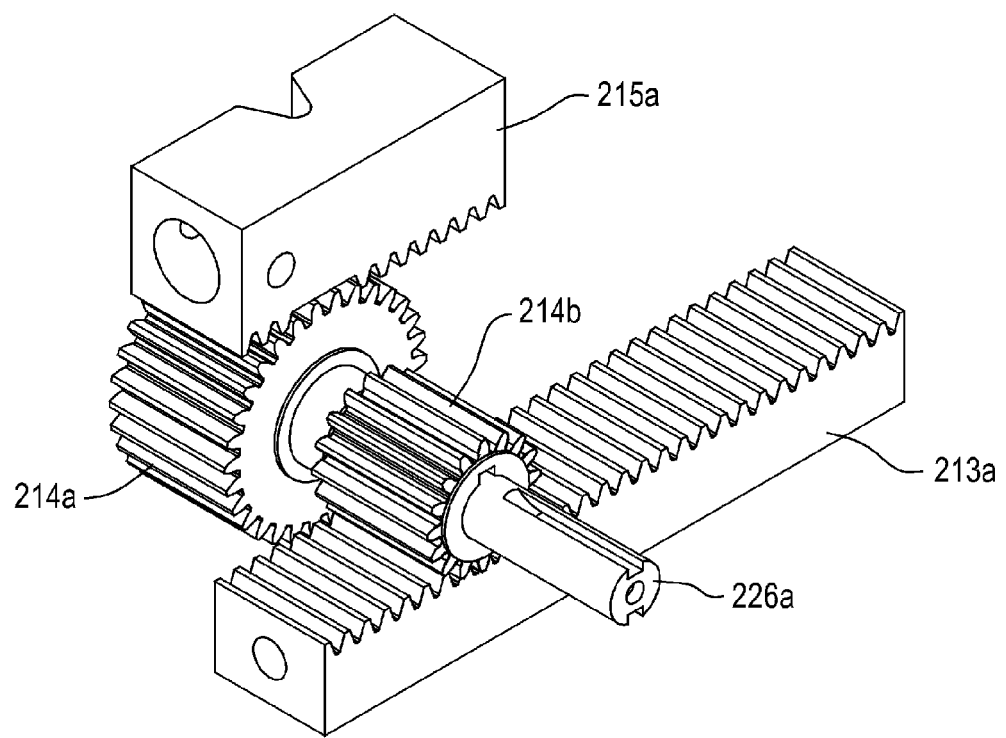
FIG. 12 shows a perspective view of another embodiment of a force-multiplying mechanism of the present invention.

FIG. 12 is a perspective view of a force-multiplying mechanism having a rack and pinion arrangement with two pinions 214a and 214b interconnected by a shaft 226a. Each pinion 214a and 214b has a different gear pitch, which in turn results in a different force amplification factor which is transmitted back to the cylinder (not shown in this view). It will be appreciated that a desired force amplification factor can be selected by appropriately selecting the pitch diameters of pinions 214a and 214b.

Figure 13:
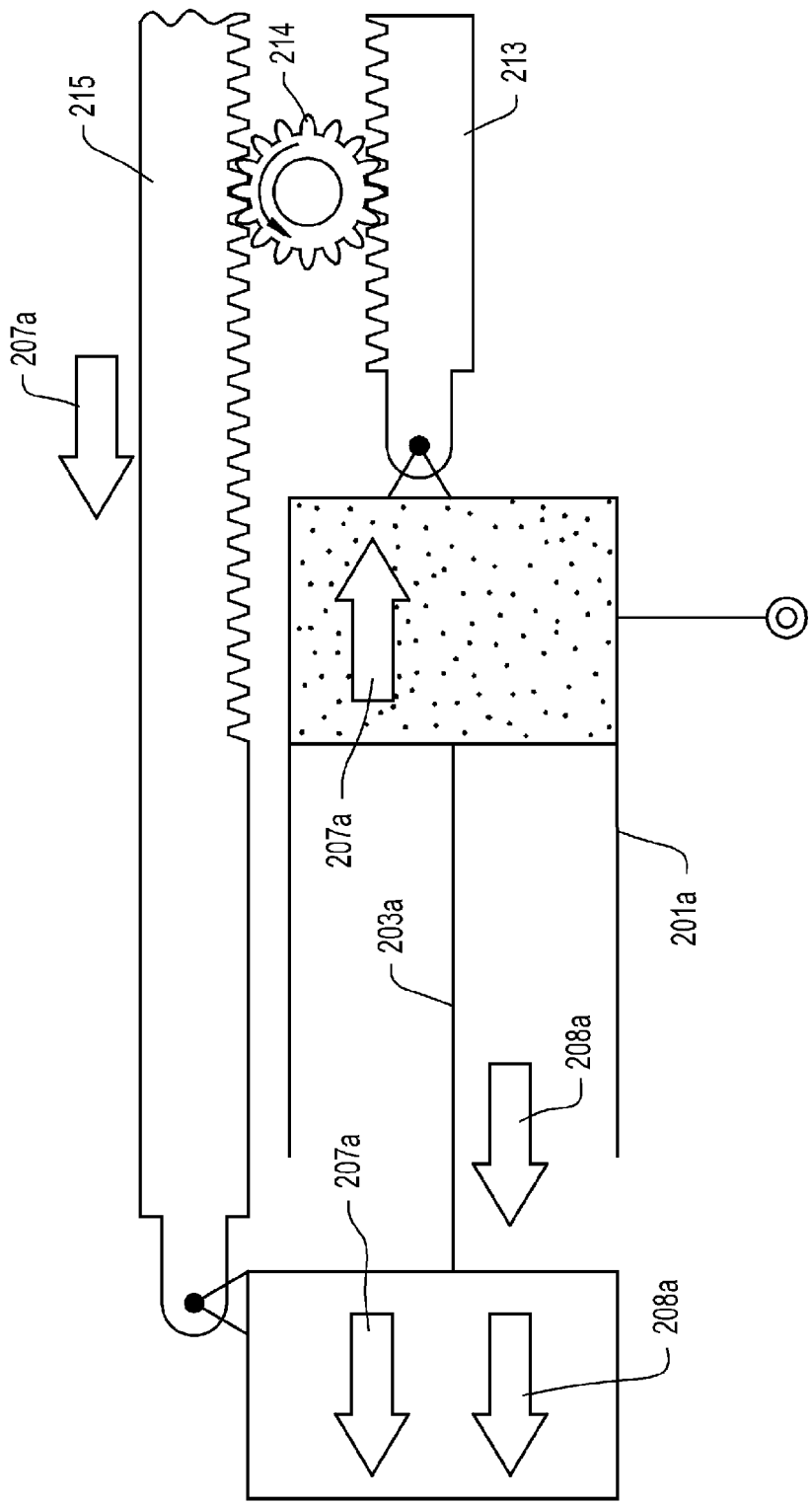
FIG. 13 shows a partially schematic view of another embodiment the gripper of the present invention.

FIG. 13 demonstrates how the driving rack 213, pinion gear 214, and driven rack 215 system is operable on cylinder 201a and piston rod 203a without changing the substance of the embodiment.

Figure 14:
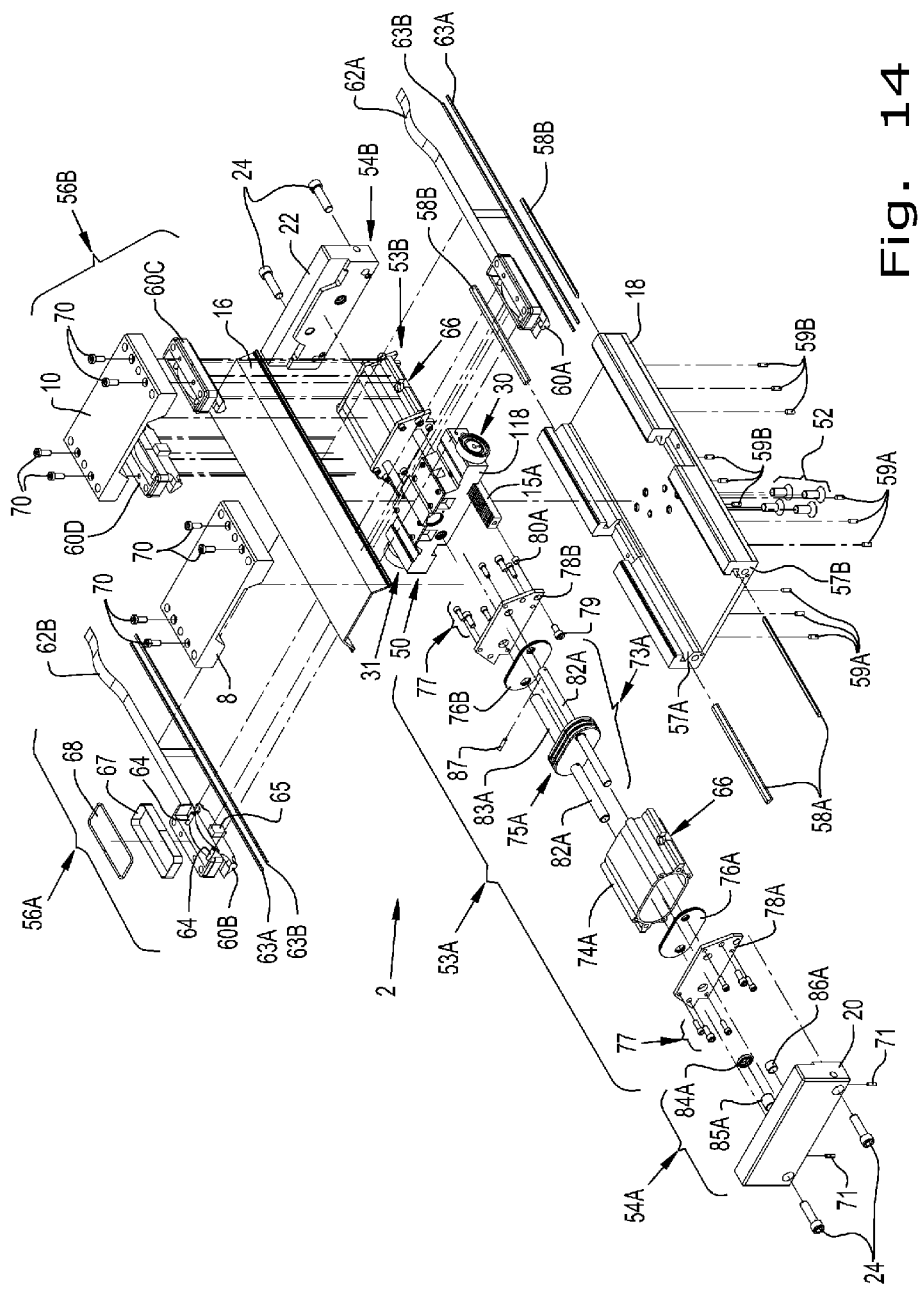
FIG. 14 is an exploded perspective view of the gripper shown in FIGS. 1-3.

FIG. 14 shows a partially exploded view of a preferred embodiment for gripper 2 with a force multiplying mechanism. Center plate assembly 50 mounts to base plate 18 with threaded fasteners 52. Cylinder assemblies 53A and 53B span the volume between center plate assembly 50 and end plate assemblies 54A and 54B, respectively. Fasteners 24 attach end plate 20, 22 of assemblies 54A and 54B to base plate 18, respectively. Jaw assemblies 56A and 56B are respectively retained in channels 57A and 57B of base plate 18 by wedges 58A and 58B, which allow identically constructed jaw guides 60A-D to translate longitudinally, while preventing vertical and lateral movement, with respect to the base plate 18. The positions of the wedges, relative to base plate 18, are adjustable via threaded fasteners 59A and 59B, respectively to remove any clearance between the jaw guides and wedges and jaw guides and base plate. The included angle of the wedge is chosen to be less than the self-locking wedge angle determined by the coefficients of friction between the wedge and abutting surfaces to prevent the wedges from locking in place during adjustment of fasteners 59. Cover 16 is disposed between jaw assemblies 56A and 56B and base plate 18.

Way covers 62A and 62B are constructed from a magnetic ferrous alloy and are held by magnetic attraction to magnetic strips 63A and 63B, respectively. Strips 63A are illustratively adhesively bonded to base plate 18, while strips 63B are illustratively adhesively bonded to cover 16. Way cover 62A passes over a curved portion of jaw guides 60A and 60C and under rollers 64, which force the way cover to conform to the curved portion of the jaw guides. Rollers 64 are retained upon their respective jaw guides by dowel pins (not shown) that are press fit into the jaw guides. In an analogous manner, way cover 62B passes over a curved portion of jaw guides 60B and 60D and under rollers 64, which force the way cover to conform to the curved portion of the jaw guides. Protrusions 65, located on each of the jaw guides, fit into mating notches 66 in oval profiled cylinders comprised within cylinder assemblies 53A and 53B to couple the longitudinal motion of the cylinders to the respective jaw assembly. Scraper bands 67, surrounding each jaw guide 60A-D, help to prevent contaminant ingress from underneath the jaw guide. Elastomeric cords 68, apply pressure to the top of each scraper band to force the band tightly against the surface of way guides 62A and 62B.

Jaw bridge 8 is attached to jaw guides 60A and 60B with threaded fasteners 70, to complete jaw assembly 56A. In an analogous manner, threaded fasteners 70 attach jaw bridge 10 to jaw guides 60C and 60D to complete jaw assembly 56B. Threaded fasteners 71 retain the ends of way covers 62A and 62B in end plate 20. A similar pair of fasteners (not shown) may retain the opposite ends of way covers 62A and 62B in end plate 22. Piston assembly 73A is disposed within cylinder assembly 53A with a similar piston assembly (shown exploded in FIG. 15) disposed within cylinder assembly 53B. Cylinder 74A surrounds piston assembly 73A. Seals (not shown) may seal the periphery of piston 75A against a complimentary oval bore in cylinder 74A to prevent the flow of motive compressed air around the piston. The ends of rods 81A, 82A, and 83A pass though seals (not shown) contained within seal retainers 76A and 76B to prevent the flow of motive compressed air around the rods. Another seal (not shown) seals the periphery of each seal retainer against the mating oval bore in cylinder 74A. Threaded fasteners 77 retain cylinder covers 78A and 78B onto cylinder 74A. Threaded fastener 79 passes through spacer 80A to fasten driven rack 15A onto cylinder cover 78A. The end of rod 82A passes through seal 84A and into bearing bushing 85A, which are both retained within complimentary bores within end plate 20. The end of rod 81A passes into bearing bushing 86A, which is similarly retained in a bore within end plate 20. It is understood that cylinder assembly 53B is constructed and constrained in an analogous manner to that described for cylinder assembly 53A. Brake assemblies 30 and 31 thread into thread bores in center plate 118.

Figure 15:
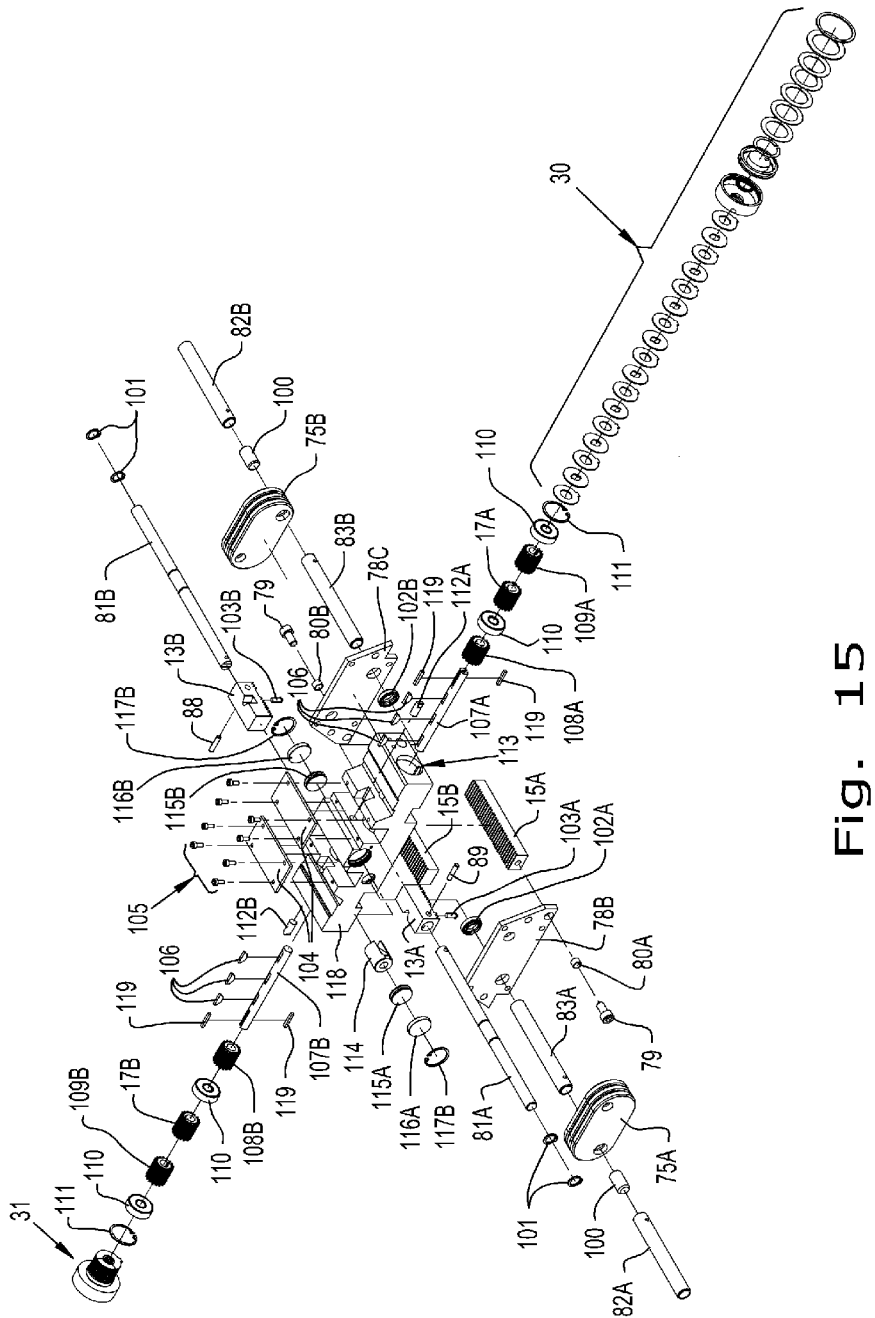
FIG. 15 is an exploded perspective view of the force-multiplying mechanism shown in FIGS. 1-3.

A partially exploded view of the force-multiplying mechanism components of gripper 2 is shown in FIG. 15. Threaded fasteners 100 join hollow rods 82A and 83A to piston 75A and join hollow rods 82B and 83B to piston 75B, respectively and prevent the flow of motive compressed air between the joined hollow rods. Retaining rings 101 retain solid rod 81A within piston 75A and retain solid rod 81B within piston 75B, respectively. Seals (not shown) within the pistons prevent the flow of motive compressed air around the rods and through the holes in the pistons through which rods 81A and 81B pass. Seals 102A and 102B, disposed in glands within base plate 118, seal the periphery of hollow rods 83A and 83B, which pass into mating bores in base plate 118. Dowel pin 87 passes through a hole through the side of driving rack 13A and into a mating hole in the end of solid rod 81A to couple the rod to the rack. In a similar fashion, another dowel pin 88 passes through a hole through the side of driving rack 13B and into a mating hole in the end of solid rod 81B to couple the rod to the rack. Driving racks 13A and 13B are disposed into mating slots in center plate 118 and prevented from vertical movement by covers 104 that are retained on the center plate by fasteners 105. Ball-detent assemblies 103A and 103B, comprising ball 24 and spring 25 (see, also, FIGS. 11a and 11b), are press-fit into mating holes in driving racks 14A and 14B, respectively.

Illustrative woodruff machine keys 106, inserted into mating keyseats in shafts 107A and 107B, key pinion gears 17A, 108A, and 109A to shaft 107A and key pinion gears 17B, 108B, and 109B to shaft 107B. Radial bearings 110, retained by retaining rings 111, support shafts 107A and 107B within complimentary bores within center plate 118. Synchronizing pinion gears 108A and 108B are in mesh so as to couple the rotation of shaft 107A to that of shaft 107B. Driven pinion gears 109A and 109B engage driven racks 15A and 15B, respectively, so that the translation of one driving rack is synchronized to the other by the action of pinion gears 108A and 108B being in mesh. The beveled ends of rack-locking pins 112A and 112B engage mating angled notches in driving racks 13A and 13B, respectively. The cylindrical body of each rack-locking pin passes through a mating hole in center plate 118 to so as to prevent longitudinal motion of the driving racks until the beveled portions of pins 112A and 112B are retracted from the mating notches in the driving racks. Once rack-locking pin 112A is retracted, driving rack 13A engages pinion gear 17A transmitting the force from motive air pressure acting on the face of piston 75A through rod 81A, to shaft 107A and pinion gear 109A, to driven rack 15A and cylinder cover 78B.

In an analogous manner, retraction of rack-locking pin 112B allows the transmission of the force applied to piston 75B through rod 81B to driving rack 13B to pinion 17B, shaft 107B, pinion gear 109B, and driven rack 15B, to cylinder cover 78C. The rotation of shafts 107A and 107B may be controlled by brake assemblies 30 and 31, respectively. Engagement of the brake prevents the associated shaft from rotating, subsequently locking the driven rack, cylinder assembly, and jaw assembly associated with that shaft.

Figure 16:
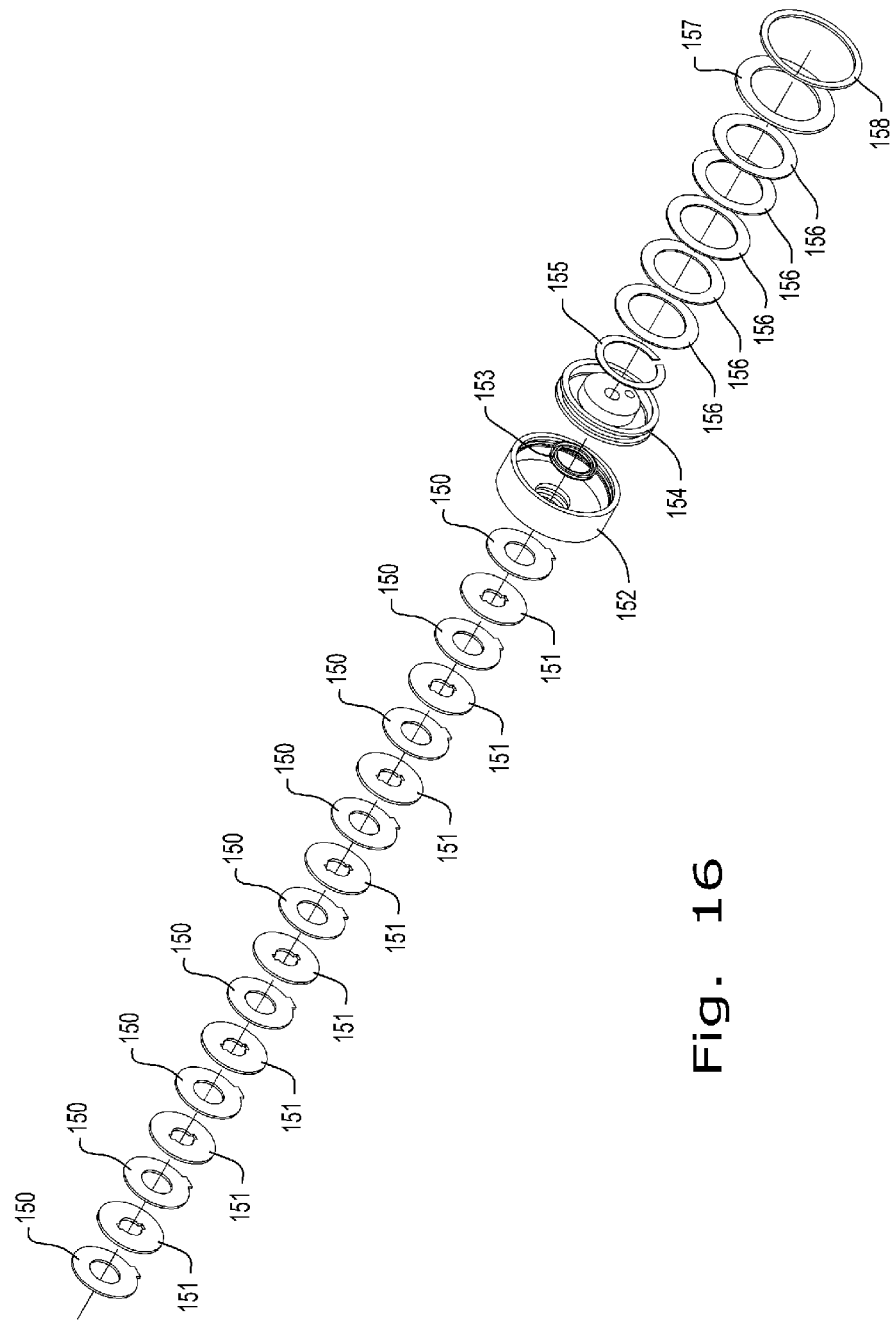
FIG. 16 is an exploded perspective view of the brake assembly shown in FIGS. 1-3, 14 and 15.

FIG. 16 shows an exploded view of brake assembly 30 shown in FIG. 15. A plurality of disks 151 are inter-disposed between a second plurality of disks 150. A tab on bottom of disk 150 engages a slot 113 within the shaft bore of center plate 118, to prevent rotation of the disk. Opposing slots in disk 151 engage feather machine keys 119 that are disposed into mating keyways in shaft 107A so as to couple rotation of the shaft to the disk. Housing 152 threads into center plate 118 to retain the brake assembly onto the gripper. Piston 154 is coaxially located within housing 152. A seal (not shown) seals the periphery of piston 154 against a complimentary bore in cylinder housing 152 to prevent the flow of motive compressed air around the piston. Rod seal 153 seals a cylindrical rod portion that protrudes from piston 154 through a hole in housing 152 to contact the closest disk 150. A plurality of coned spring washers 156 are disposed between split washer 155 and washer 157 to apply a force against piston 154 and subsequently, against the stack of disks 150 and disks 151. Spiral retaining ring 158 engages an annular groove in housing 152 to retain washer 155, coned spring washers 156, and washer 157 within housing 152.

In operation, the brake assembly is disengaged by applying compressed air into the cavity formed between the underside of piston 154 and housing 152 creating a force that acts on the face of piston 154 sufficient to overcome the force applied to the opposing face of the piston by coned spring washers 156. The brake assembly is engaged by removing the applied compressed air, allowing coned spring washers 156 to apply a force against piston 154 and in-turn, against the stack of disks 150 and 151. Retaining ring 111 prevents movement of the stack of disks along the axis of shaft 107A. (See, also, FIG. 15.) As the force applied by coned spring washers 156 passes through each consecutive disk-to-disk interface, frictional forces are created at the interface that oppose the rotation of one disk relative to the adjoining disk. These frictional forces effectively couple the rotation of disks 151, keyed to shaft 107A, to that of disks 150, prevented from rotation by the engagement of the tab of each disk into slot 113, to impede rotation of the shaft. It is understood that brake assembly 31 operates in an analogous manner to the operation described for brake assembly 30 allowing brake 31 to control the motion of shaft 107B.

Figure 17A:
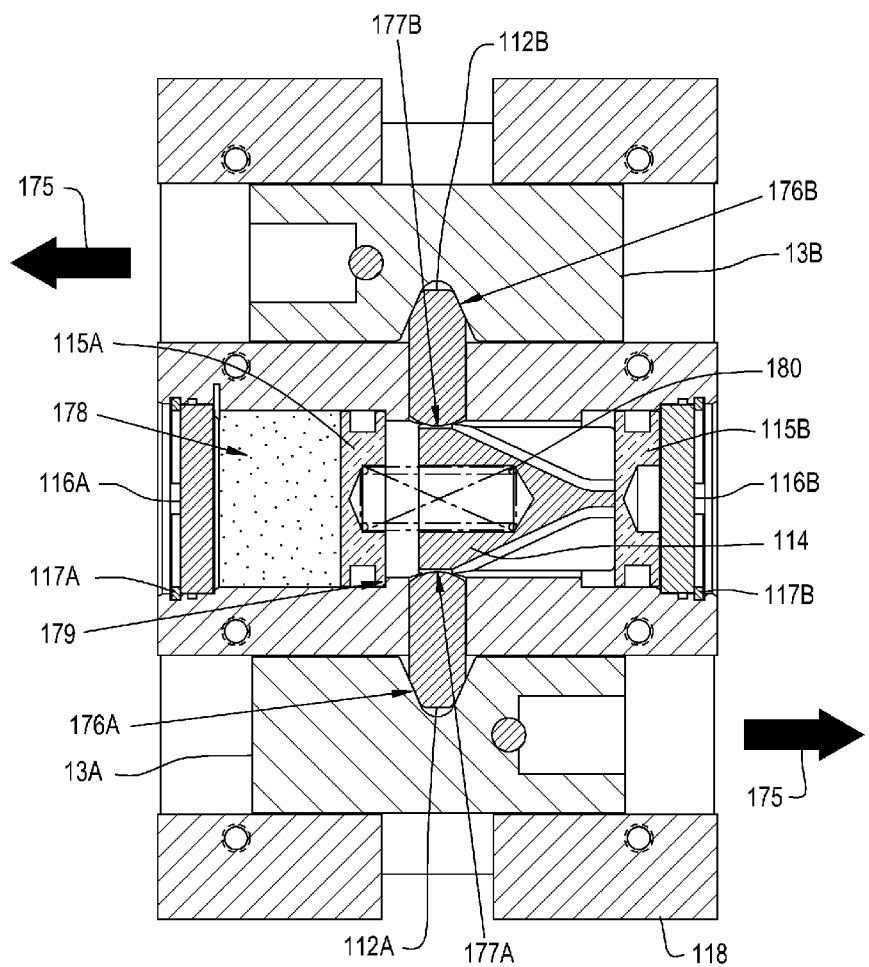
FIGS. 17*a*, 17*b* and 17*c* are cross-sectional views illustrating operation of the force-multiplying mechanism of FIGS. 1-3 during operation.
Figure 17B:
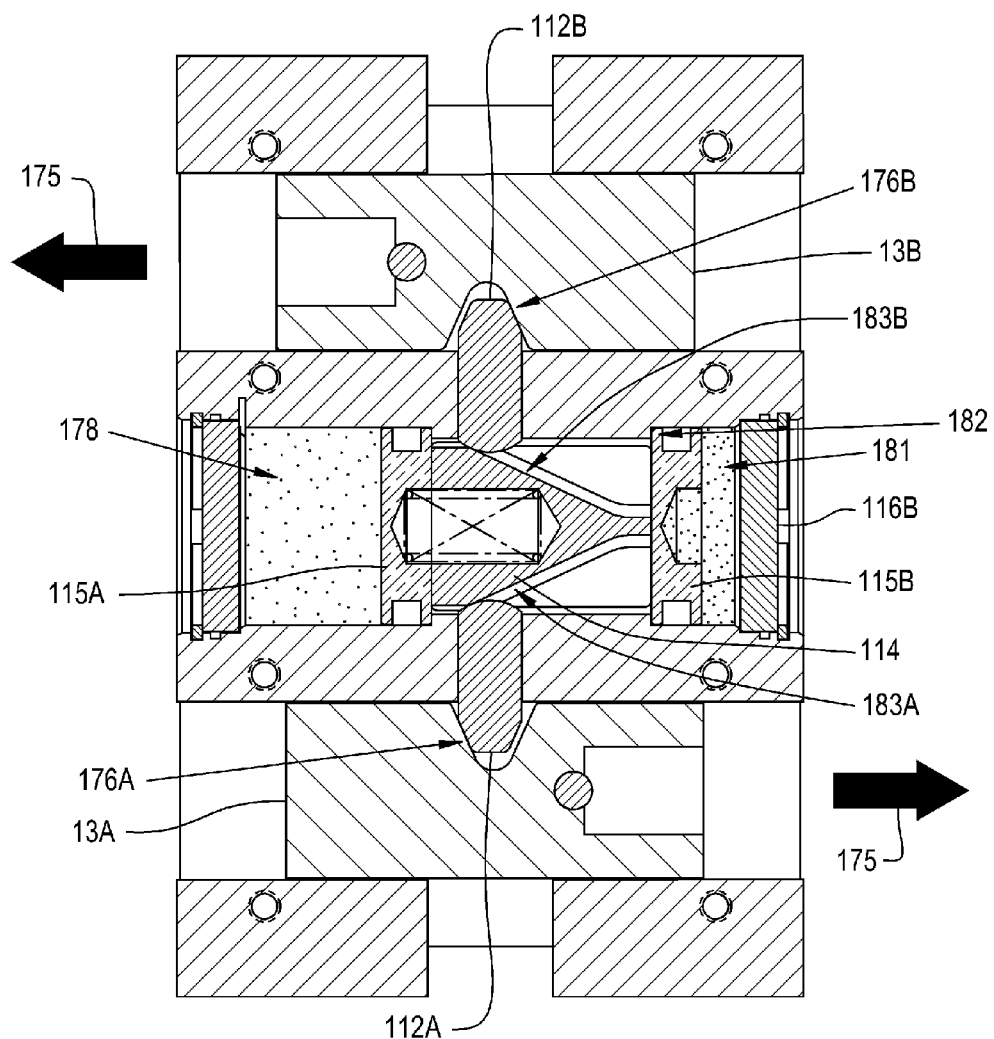
Figure 17C:
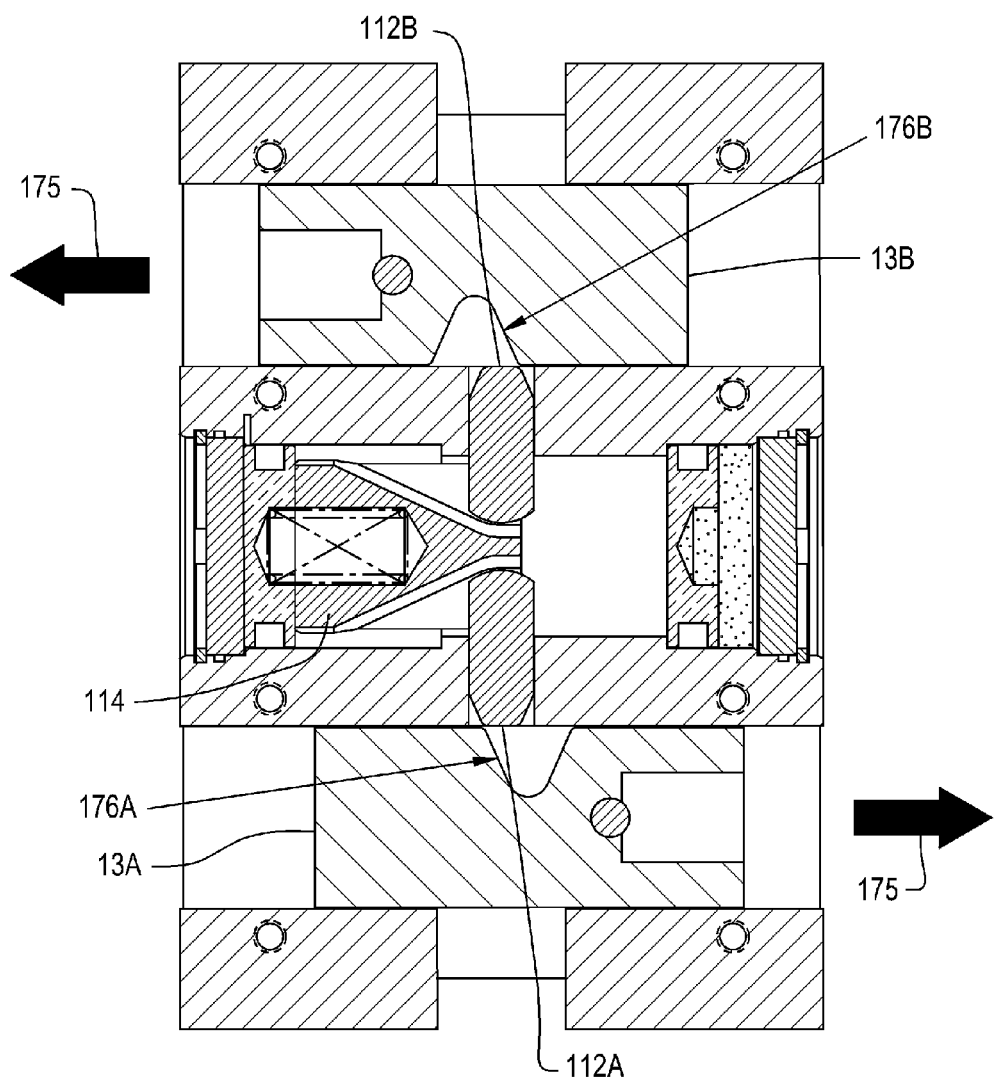

FIGS. 17a-17c show a series of cross-sectional views taken through the centerline of rack-locking pins 112A and 112B and illustrate the sequence of events that occur during engagement of the force multiplying mechanism. (See, also, FIG. 15). FIG. 17a shows the relationship of components with the force multiplying mechanism disengaged. Arrows 175 indicate the direction of forces acting on driving racks 13A and 13B. The angled contact surfaces 176A and 176B between rack-locking pins 112A and 112B and driving racks 13A and 13B, respectively, impart vectoral components of the forces 175 acting on the racks to produce forces that act to push the rack-locking pins towards the center of control cam 114. The bases 177A and 177B of rack-locking pins 112A and 112B, respectively, rest against horizontal surfaces of control cam 114, which prevent axial movement of the pins and the associated translation of the rack engaged by each pin. Compressed air, filling the volume 178 between cushion piston 115A and bore plug 116A, forces the piston against annular shoulder 179 in center plate 118. Seals (not shown) seal the periphery of control piston 115A and the periphery of bore plug 116A against the walls of center plate 118. Bore plug 116A is retained in center plate 118 by retaining ring 117A which engages a complimentary annular groove in the center plate. Helical spring 180 (shown schematically in FIGS. 17a-17c and not shown in FIG. 15), is disposed between a bore in cushion piston 115A and a coaxially aligned bore in control cam 114 so as to force control cam 114 against control piston 115B and bore plug 116B, which is retained by retaining ring 117B.

FIG. 17b shows the relationship of components with the force multiplying mechanism activated, but prior to the driving racks engaging the driving pinion gears. Compressed air has been directed into the volume 181 between bore plug 116B and control piston 115B with the resulting force of the air pressure acting of the face of the piston sufficient to overcome the force of spring 180 and the frictional forces applied by rack-locking pins 112A and 112B. Seals (not shown) seal the periphery of control piston 115B and the periphery of bore plug 116B against the walls of center plate 118. The motion of control piston 115B away from bore plug 116B and into contact with annular shoulder 182 of center plate 118 moves control cam 114 into a position where the ends 177A and 177B of rack lock pins 112A and 112B, engage angled surfaces 183A and 183B of the control cam, respectively. The angle of surfaces 183A and 183B is chosen so that vectoral components of the forces that act to push the rack-locking pins towards the center of control cam 114 combine to exert a force that pushes control cam 114 into contact with cushion piston 115A. A double-acting valve, used to control activation of the force-multiplying mechanism, is configured to simultaneously exhaust air pressure from cavity 178 as air pressure is applied to cavity 181 to activate the mechanism. Forces 175 acting upon driving racks 13A and 13B can have large magnitudes, which can cause the racks to accelerate to large velocities prior to a rack engaging the corresponding driving pinion gear. It is desirable to reduce the engagement velocity of the rack so as to minimize the force generated as the tooth of the rack impacts against the meshing tooth of the pinion. This desirable reduction in engagement velocity is accomplished by controlling the rate at which air is exhausted from cavity 178. Reducing the exhaust rate creates a back-pressure against the face of cushion piston 115, subsequently slowing the travel of control cam 114 and the associated retraction rate of rack-locking pins 112A and 112B, should driving racks 13A and 13B be propelled too rapidly by the action of forces 175.

FIG. 17c shows the relationship of components with the force multiplying mechanism fully engaged. The compressed air in cavity 178 has been completely exhausted allowing control cam 114 to move into a position allowing rack-locking pins 112A and 112B to fully retract from racks 13A and 13B, respectively. With the pins no longer engaging surfaces of 176A and 176B of driving racks 13A and 13B, respectively, the racks are free to move unencumbered in the direction of forces 175.

The present disclosure illustratively shows an actuator in the form of a pneumatic piston and cylinder arrangement which generates motive force. This disclosure, however, also contemplates employing an electric or fluid actuated motor to generate the motive force as well. An example of a motor driven actuator is disclosed in U.S. Pat. No. 8,152,214 (Williams et al.), which is assigned to the assignee of the present invention and incorporated herein by reference.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid actuated gripper for gripping a workpiece, said gripper comprising:
    a jaw assembly including a cylinder, a piston slidably positioned within said cylinder, and a piston rod having a first end coupled with said piston, said piston having a head end positioned adjacent a fluid chamber for receiving a pressurized fluid; and
    a force-multiplying mechanism including a force reversing mechanism interconnected between a second end of said piston rod and said cylinder such that a force applied to said piston rod applies an oppositely directed force to said cylinder, said force reversing mechanism being configured to add a mechanical force to said jaw assembly and thereby increase a gripping force on the workpiece during operation of said gripper.

2. The fluid actuated gripper of claim 1, wherein said cylinder has an end face defining a jaw for clamping the workpiece, and wherein said force-multiplying mechanism includes a rack and pinion arrangement having a first rack connected with said second end of said piston rod, a second rack connected with said cylinder, and at least one pinion gear interconnecting between said first rack and said second rack.

3. The fluid actuated gripper of claim 2, wherein said at least one pinion gear comprises a single pinion gear.

4. The fluid actuated gripper of claim 2, wherein said at least one pinion gear comprises a first pinion gear connected with said first rack, and a second pinion gear connected with each of said first pinion gear and said second rack.

5. The fluid actuated gripper of claim 4, wherein said first pinion gear and said second pinion gear have a different gear pitch.

6. The fluid actuated gripper of claim 2, wherein said first rack includes a stripped area with no teeth allowing rotation of said pinion without relative translation of said first rack, and further including a locking arrangement for fixing a translational position of said first rack.

7. The fluid actuated gripper of claim 6, wherein said locking arrangement is a locking pin arrangement.

8. The fluid actuated gripper of claim 6, wherein said pinion is carried by a shaft with an oversized keyway allowing relative rotational movement between said pinion and said shaft, and wherein said first rack includes a ball and detent arrangement in said stripped area which coacts with said oversized keyway to allow translational movement between said rack and said pinion in the event of an interference condition therebetween.

9. The fluid actuated gripper of claim 1, further including a jaw connected to said second end of said piston rod, and wherein said force-multiplying mechanism includes a rack and pinion arrangement having a first rack connected with said jaw, a second rack connected with said cylinder, and at least one pinion gear interconnecting between said first rack and said second rack.

10. The fluid actuated gripper of claim 1, wherein said force-multiplying mechanism includes a lever arrangement having at least one lever interconnecting between said piston rod and said cylinder.

11. The fluid actuated gripper of claim 10, wherein said at least one lever comprises a single lever with a first end connected to said second end of said piston rod, a second end connected to said cylinder, and a pivot point positioned between said first end and said second end.

12. The fluid actuated gripper of claim 11, wherein said pivot point is pivotally coupled to an immovable structure.

13. The fluid actuated gripper of claim 11, wherein said position of said pivot point between said first end and said second end defines an amplification factor of said force-multiplying mechanism.

14. The fluid actuated gripper of claim 11, further including a linkage interconnecting between said second end of said lever and said cylinder.

15. The fluid actuated gripper of claim 1, wherein said fluid actuated gripper is a pneumatic gripper.

16. A method of operating a fluid actuated gripper for gripping a workpiece, said method comprising the steps of:
    providing a jaw assembly including a cylinder, a piston slidably positioned within said cylinder, and a piston rod having a first end coupled with said piston, said piston having a head end positioned adjacent a fluid chamber;
    positioning said jaw assembly relative to the workpiece;
    pressurizing said fluid chamber with a fluid and thereby causing extension of said piston and said piston rod from said cylinder, and generating a clamping force on the workpiece using said jaw assembly;
    generating a mechanical force using a force-multiplying mechanism including a force reversing mechanism interconnected between a second end of said piston rod and said cylinder such that a force applied to said piston rod applies an oppositely directed force to said cylinder, using said extension of said piston rod from said cylinder; and
    applying said mechanical force to said jaw assembly and thereby cumulatively increasing a gripping force on the workpiece during operation of said gripper.

17. The method of operating a fluid actuated gripper of claim 16, wherein said cylinder has an end face defining a jaw for gripping the workpiece, and wherein said force-multiplying mechanism includes a rack and pinion arrangement having a first rack connected with said second end of said piston rod, a second rack connected with said cylinder, and at least one pinion gear interconnecting between said first rack and said second rack.

18. The method of operating a fluid actuated gripper of claim 16, wherein said force-multiplying mechanism includes a lever arrangement having at least one lever interconnecting between said piston rod and said cylinder.

19. A gripper for gripping a workpiece, said gripper comprising:
- a jaw assembly including an actuator with a housing and an elongate member axially slidably movable within said housing; and
- a force-multiplying mechanism including a force reversing mechanism interconnected between said elongate member and said housing such that a force applied to said elongate member applies an oppositely directed force to said housing, said force reversing mechanism being configured to add a mechanical force to said jaw assembly and thereby increase a gripping force on the workpiece during operation of said gripper.

20. The gripper of claim 19, wherein said actuator comprises one of:
- a) a pneumatic actuator, wherein said housing is comprised by a cylinder and said elongate member is comprised by a piston rod attached to a piston slidably movable within said cylinder, and said force-multiplying mechanism is interconnected between said piston rod and said cylinder;
- b) a hydraulic actuator, wherein said housing is comprised by a cylinder and said elongate member is comprised by a piston rod attached to a piston slidably movable within said cylinder, and said force-multiplying mechanism is interconnected between said piston rod and said cylinder; and
- c) an electric or fluid operated motor and said elongate member is comprised by a threaded rod which is axially movable upon operation of said motor, and said force-multiplying mechanism is interconnected between said threaded rod and said housing.

21. The gripper of claim 20, wherein said actuator is one of said pneumatic actuator and said hydraulic actuator, and wherein said cylinder has an end face defining a jaw for gripping the workpiece, and said force-multiplying mechanism includes a rack and pinion arrangement having a first rack connected with said piston rod, a second rack connected with said cylinder, and at least one pinion gear interconnecting between said first rack and said second rack.

22. The gripper of claim 20, wherein said actuator is one of said pneumatic actuator and said hydraulic actuator, and wherein said force-multiplying mechanism includes a lever arrangement having at least one lever interconnecting between said piston rod and said cylinder.

* * * * *